(12) United States Patent
Costa et al.

(10) Patent No.: US 12,339,881 B2
(45) Date of Patent: Jun. 24, 2025

(54) QUESTION-ANSWER REFERENCE DATA SET GENERATION FOR ARTIFICIAL INTELLIGENCE

(71) Applicant: SAP SE, Walldorf (DE)

(72) Inventors: Guilherme Ehrhardt Soares Ferreira da Costa, Lisbon (PT); Jan Portisch, Bruchsal (DE); Katharina Minninger, Karlsruhe (DE); Michael Hladik, Walldorf (DE); Robert Weller, Heidelberg (DE)

(73) Assignee: SAP SE, Walldorf (DE)

( * ) Notice: Subject to any disclaimer, the term of this patent is extended or adjusted under 35 U.S.C. 154(b) by 342 days.

(21) Appl. No.: 18/103,185

(22) Filed: Jan. 30, 2023

(65) Prior Publication Data

US 2024/0273123 A1 Aug. 15, 2024

(51) Int. Cl.
*G06F 40/30* (2020.01)
*G06F 16/332* (2019.01)
*G06F 16/3329* (2025.01)

(52) U.S. Cl.
CPC ...... *G06F 16/3329* (2019.01); *G06F 16/3326* (2019.01); *G06F 40/30* (2020.01)

(58) Field of Classification Search
CPC ............. G06F 16/2433; G06F 16/3329; G06F 16/3326; G06F 16/332; G06F 40/30; G06N 20/00; G06N 5/04
See application file for complete search history.

(56) References Cited

U.S. PATENT DOCUMENTS

| 2017/0177715 A1* | 6/2017 | Chang | G06N 5/04 |
| 2020/0311070 A1* | 10/2020 | Yan | G06N 20/00 |
| 2022/0107946 A1* | 4/2022 | Kaplan | G06F 16/2433 |

OTHER PUBLICATIONS

Dubey, Mohnish, et al., "LC-QuAD 2.0: a Large Dataset for Complex Question Answering over Wikidata and DBpedia", 18th International Semantic Web Conference, (2019), 8 pgs.
Panetta, Kasey, "5 Trends Appear on the Gartner Hype Cycle for Emerging Technologies, 2019", Gartner, Inc., [Online]. Retrieved from the Internet: <URL: https://www.gartner.com/smarterwithgartner/5-trends-appear-on-the-gartner-hype-cycle-for-emerging-technologies-2019>, (Aug. 29, 2019), 6 pgs.
Paulheim, Heiko, "Knowledge Graph Refinement: a Survey of Approaches and Evaluation Methods", Semantic Web, 8(3), IOS Press, (2016), 23 pgs.

* cited by examiner

*Primary Examiner* — Huyen X Vo
(74) *Attorney, Agent, or Firm* — SCHWEGMAN LUNDBERG & WOESSNER, P.A.

(57) ABSTRACT

In an example embodiment, a system is provided that takes a knowledge graph as input and generates multiple question templates based on predefined query types. These query types may be, for example, SPARQL query types and may also be configurable. The system repeatedly presents a single randomly or pseudo-randomly picked question template to a user, and asks the user to type a corresponding natural language question. The system persists the answer provided by the user with the question in a specialized format. Then, for each typed question, the system creates additional linguistic variations and asks users to rate them.

17 Claims, 15 Drawing Sheets

METASTRUCTURE - JSON SCHEMA

| METASTRUCTURE |
|---|
| TYPE: OBJECT |
| DATASET |
| QUESTIONS |

1100 →
1102 → DATASET
1104 → QUESTIONS

| QUESTIONS |
|---|
| ROOT → QUESTIONS |
| TYPE: ARRAY OF OBJECT |
| THE DATASET ITSELF |
| EACH ITEM OF THIS ARRAY MUST BE: |
| ROOT → QUESTIONS → QUESTIONS ITEMS |
| TYPE: OBJECT |
| TEMPLATE_ID |
| QUERY |
| ANSWER |
| TEMPLATE_QUESTION |
| VERBALIZED_QUESTION |
| REPHRASED_QUESTIONS |

| TEMPLATE_QUESTION |
|---|
| ROOT→QUESTIONS→QUESTIONS ITEMS →TEMPLATE_QUESTION |
| TYPE: STRING |
| INTERMEDIATE STAGE BETWEEN NATURAL LANGUAGE AND THE FORMAL LANGUAGE OF SPARQL. WHAT IS SHOWN TO THE USERS. |
| VERBALIZED_QUESTION |
| ROOT→QUESTIONS→QUESTIONS ITEMS→VERBALIZED_QUESTION |
| TYPE: STRING |
| NATURAL LANGUAGE QUESTION TYPED BY THE QUESTION WRITER |
| REPHRASED_QUESTIONS |
| ROOT→QUESTIONS→QUESTIONS ITEMS→REPHRASED_QUESTIONS |
| TYPE: ARRAY OF OBJECT |
| CONTAINS QUESTIONS REPHRASED BY THE REPHRASING COMPONENT AND SELECT BY THE USERS. |
| EACH ITEM OF THIS ARRAY MUST BE: |
| ROOT→QUESTIONS→QUESTIONS ITEMS →REPHRASED_QUESTIONS→REPHRASED_QUESTIONS ITEMS |
| TYPE: OBJECT |
| REPHRASED_QUESTIONS |
| ROOT_QUESTIONS_QUESTIONS ITEMS_REPHRASED_QUESTIONS_REPHRASED_QUESTIONS ITEMS |
| TYPE: OBJECT |

*FIG. 12*

QUESTION-ANSWER REFERENCE DATA SET GENERATION FOR ARTIFICIAL INTELLIGENCE

BACKGROUND

Enterprise Resource Planning (ERP) software integrates into a single system various processes used to run an organization, such as finance, manufacturing, human resources, supply chain, services, procurement, and others. These processes typically provide intelligence, visibility, and efficiency across most if not all aspects of an organization. One example of ERP software is SAP® S/4 HANA from SAP SE of Walldorf, Germany.

An enterprise resource planning (ERP) system may provide integrated applications and technology to automate many back office functions related to technology, services, human resources, and the like. For example, ERP software may integrate various functions of an operation, such as product planning, development, manufacturing, sales, and marketing, in a database application and user interface.

BRIEF DESCRIPTION OF DRAWINGS

The present disclosure is illustrated by way of example and not limitation in the figures of the accompanying drawings, in which like references indicate similar elements.

FIG. 12 is a diagram illustrating an example of a second portion of a metastructure format, in accordance with an example embodiment.

DETAILED DESCRIPTION

Figure 1:
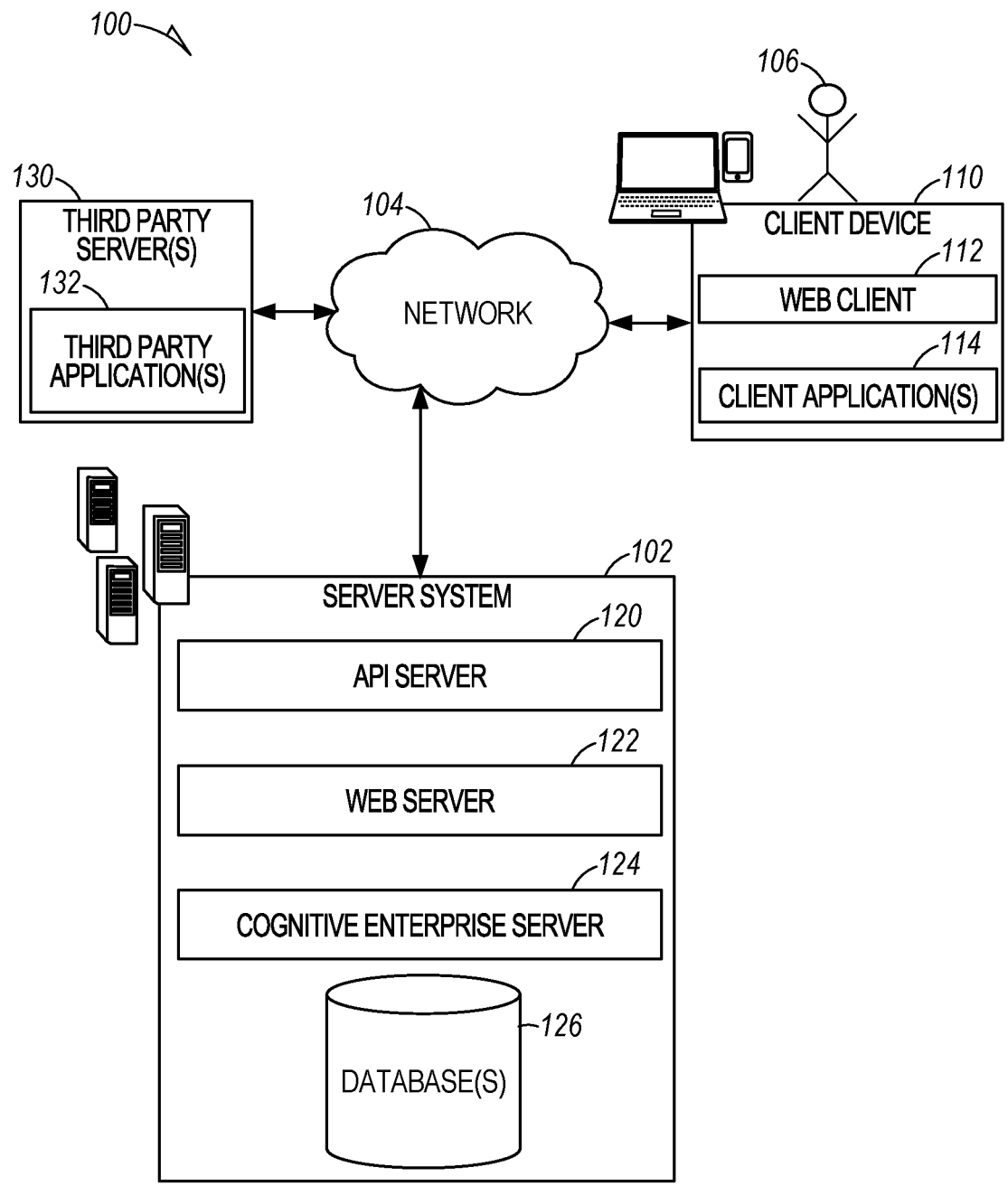
FIG. 1 is a block diagram illustrating a networked system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Conversational applications are considered the next user interface (UI) paradigm after web and mobile. New chat bot technologies are starting to become more prevalent, and many entities are evaluating or providing chat bots. Chat bot is a technology service that allows a user to interface via a chat interface. A chat bot may be powered by rules, artificial intelligence, and other technologies. There has also been significant research in natural language processing and understanding using machine learning and artificial intelligence, which may be used to develop conversational UIs for users. Moreover, smart phones have raised implicit expectations for applications to be proactive, such as suggesting a best route based on learnings of individual travel patterns.

In recent years, ERP systems, and other systems as well, have begun storing more and more data in knowledge graphs. Knowledge graphs are graphs that represent relationships between different classes of an organization's data. This may include concepts and their related semantic relations. Enterprises are increasing their efforts to build and consistently grow large knowledge graphs, which they can use for delivering artificial intelligence capabilities. At the same time, software vendors grow their product offerings in the related areas of Semantic Web technologies and semantic artificial intelligence services.

While knowledge graphs can be exploited for machine-learning applications, one advantage they provide, particularly when compared to relational database, is the ability of non-technical users to retrieve information from the knowledge graphs.

The most intuitive and effective way of serving the information intent of users is through natural language. However, building up natural language capabilities, and specifically question-answering engines that are designed to obtain a natural language question and produce a corresponding answer using a corresponding knowledge graph, is difficult and requires a significant amount of training data.

There are currently different ways in which questions and answers are obtained or created for use as training data. One example is for a consultant to manually collect natural language questions in a spreadsheet, and then manually translate them to SPARQL questions that can be queried against the corresponding knowledge graph. Not only is this process burdensome, but there may be errors in the questions, since they may have been collected from actual user queries, and many questions can be duplicates, or at least significantly similar, to one another. Use of such duplicates during training may actually be harmful to the training process, as it can introduce bias. Additionally, linguistic variations from question to question can result in situations where there are multiple different ways to ask the same question, and yet it can be difficult for training data to include those linguistic variations, making it more difficult for the resultant trained machine learning model to understand those variations.

In an example embodiment, a system is provided that takes a knowledge graph as input and generates multiple template questions based on predefined query types and associated question templates. These query types may be, for example, SPARQL query types and may also be configurable. The system repeatedly presents a single randomly, pseudo-randomly picked, or algorithmically determined question template, then the system generates a template question and presents it to a user The system persists the answer provided by the user with the question in a specialized format. Then, for each typed question, the system creates additional linguistic variations and asks users to rate them.

In a further example embodiment, a gamification and trust component are used to validate questions via user feedback and generate trust scores for users. Incorrect questions therefore can be automatically discarded. A metastructure is also provided for the collection of questions and answers.

FIG. 1 is a block diagram illustrating a networked system 100, in accordance with an example embodiment. The system 100 may include one or more client devices such as client device 110. The client device 110 may comprise, but is not limited to, a mobile phone, desktop computer, laptop, portable digital assistants (PDA), smart phone, tablet, Ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to create or generate queries.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110, and the input may be communicated to other entities in the system 100 (e.g., third party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Microsoft Edge® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, a cognitive enterprise application, and the like.

In some embodiments, one or more client applications 114 may be included in a given one of the client devices 110, and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., access ERP data, process user queries, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110. The server system 102 may include an application program interface (API) server 120, a web server 122, and a cognitive enterprise server 124, which may be communicatively coupled with one or more databases 126.

The one or more databases 126 may be storage devices that store ERP system-related data, user data, and other data. The one or more databases 126 may further store information related to third party servers 130, third party applications 132, client devices 110, client applications 114, users 106, and so forth. The one or more databases 126 may include cloud-based storage.

The server system 102 may be a cloud computing environment, according to some example embodiments. The server system 102, and any servers associated with the server system 102, may be associated with a cloud-based application, in one example embodiment.

The enterprise server 124 may provide back-end support for third-party applications 132 and client applications 114, which may include cloud-based applications. In one embodiment, the enterprise server 124 may receive queries generated by users and process the queries to generate a response to the queries.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more the third party applications 132 may request and utilize information from the server system 102 via the API server 120 to support one or more features or functions on a website hosted by the third party or an application hosted by the third party. The third party website or application 132, for example, may provide enterprise functionality that is supported by relevant functionality and data in the server system 102.

Figure 2:
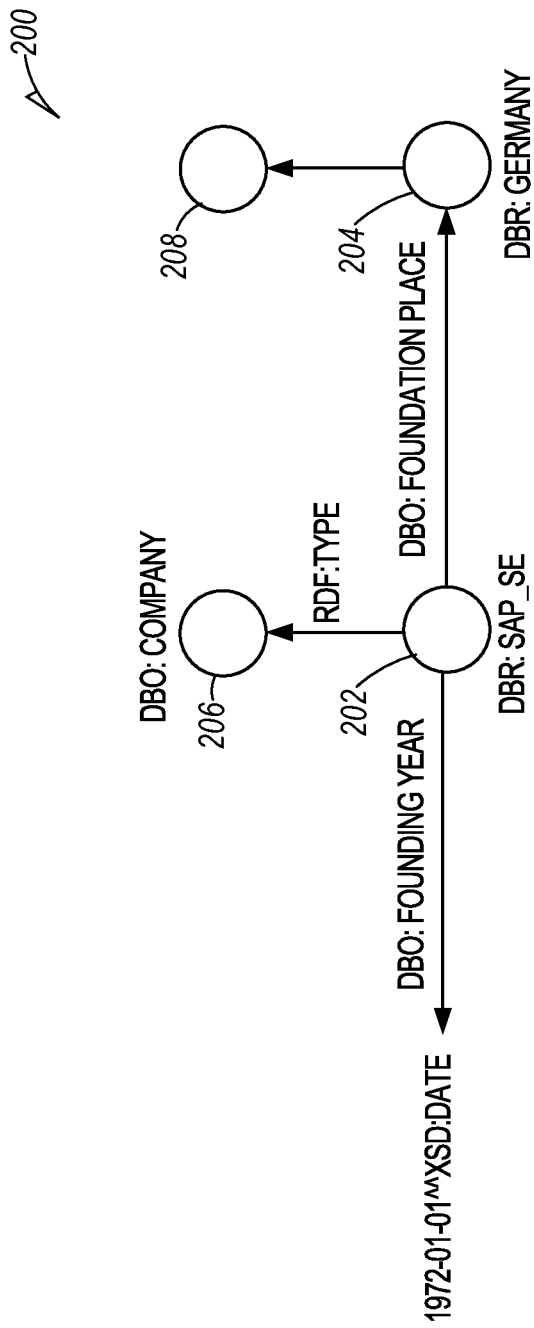
FIG. 2 is a diagram illustrating an example of a knowledge graph, in accordance with an example embodiment.

A knowledge graph mainly describes real world entities and their interrelations, organized in graph form. It defines possible classes and relations of entities in a schema and allows for potentially interrelating arbitrary entities with each other. A knowledge graph also can cover various topical domains. FIG. 2 is a diagram illustrating an example of a knowledge graph 200, in accordance with an example embodiment. A knowledge graph may include two different types of statements, called T-box and A-box. T-box statements are related to a terminology component and describe a domain of interest by defining classes and properties as a domain vocabulary. A-box statements are the "assertion component"—facts associated with the T-box's conceptual model or ontologies. A-box statements typically deal with concrete entities, and specify what category an entity belongs to, or what relation one entity has to another entity.

In FIG. 2, nodes 202 and 204 represent A-box statements, specifically typed entities, while nodes 206 and 208 represent T-box statements. In a standard environment, for example, a resource description framework (RDF) can provide a schema definition, such as grouping nodes 202, 204 and edge 210 as a triple statement: subject, predicate, object, and node identification for nodes 206 and 208 performed via uniform resource identifiers (URIs).

Every RDF schema is also an RDF document, with one element being class. Classes may form hierarchies, and multiple inheritances are possible. Another element is property. Properties resemble two-valued predicates in predicate logic, and also can form hierarchies. Properties are independent of classes and can contain a domain and a range.

Knowledge graphs can be efficiently queried using a query language, such as SPARQL. For example, if a user wants to know what the populations of cities in China that have more than 100,000 inhabitants are, then a user may generate the following SPARQL query:

```
SELECT ?city ?population WHERE {
    ?city a dbo:City .
    ?city dbo:country :China.
    ?city dbo:populationTotal ?population .
    FILTER(?population > "100000"^^xsd:integer)
} ORDER BY DESC (?population)
```

As mentioned above, in an example embodiment, a system is provided that takes a knowledge graph as input and generates multiple question templates. In an example embodiment, these question templates are based on configurable predefined SPARQL query types. The system then repeatedly presents a single randomly, pseudo-randomly, or algorithmically determined question template; then the system generates a template question and presents it to a user. The system persists the answer together with the question in a unique format. A gamification and trust aspect can also be added to validate questions via user feedback and generate trust scores for users, so as to automatically discard incorrect questions.

There may be two party types involved: a dataset requester and question writers. The dataset requester is interested in building a question/answer dataset for a specific knowledge graph. Here, the dataset requester can configure the solution and identify relevant query templates and associated question templates. Question writers are responsible for providing natural language questions, and optionally for picking the best linguistic variations of the original questions.

Figure 3:
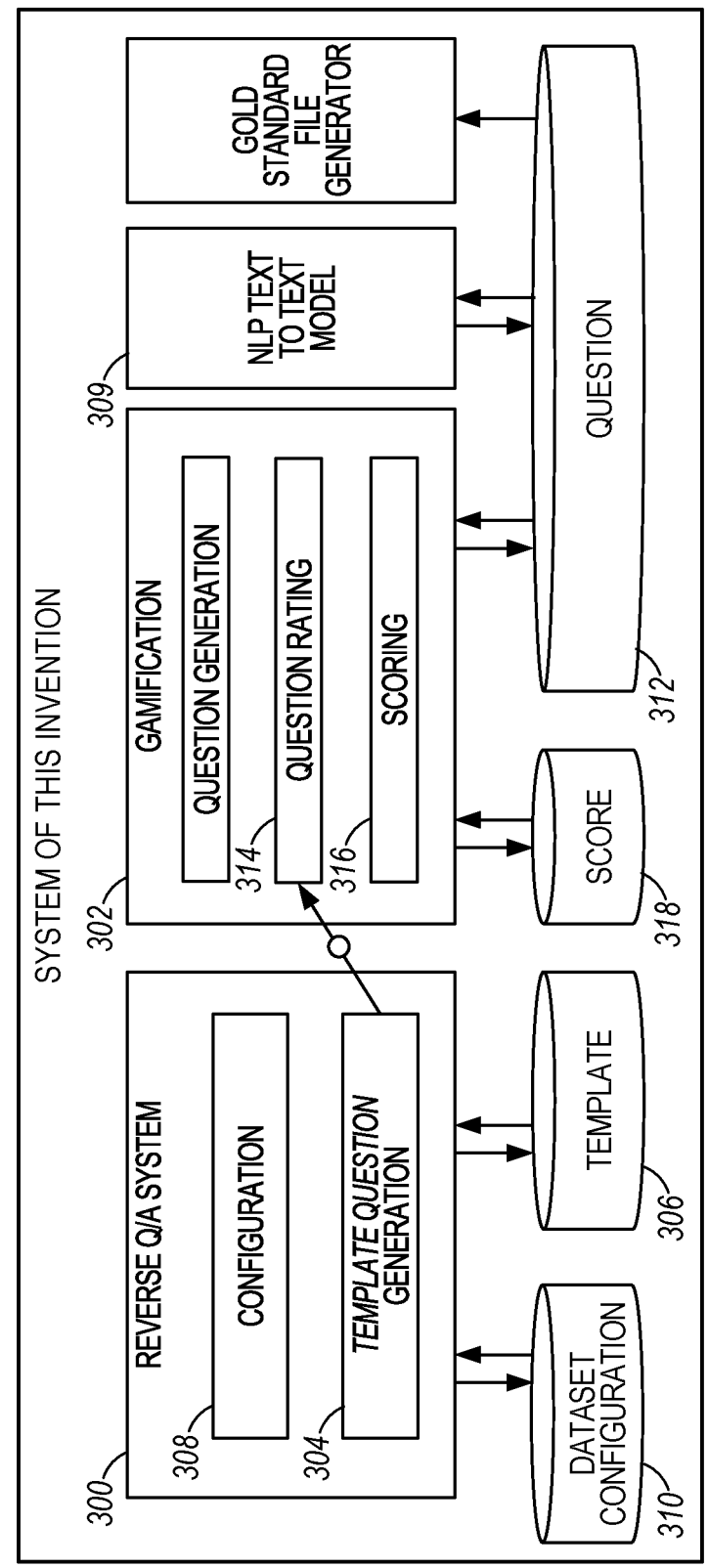
FIG. 3 is a block diagram illustrating an enterprise server, in accordance with an example embodiment.

FIG. 3 is a block diagram illustrating an enterprise server 124, in accordance with an example embodiment. Here, the enterprise server 124 includes a reverse question/answer system 300 and a gamification component 302. The reverse question/answer system 300 includes a template question generation component 304, which generates template questions from templates stored in a template database 306, in accordance with a configuration 308.

More particularly, the dataset requester identifies a knowledge graph, which may include setting up a SPARQL endpoint for the knowledge graph that will be used in the dataset creation. The dataset requester then defines SPARQL query templates. Each query template is a template of how a query is generated, such as SELECT ?answer WHERE {?(e) ?(p) ? answer.} In other words, each query template represents a type of question, as specified through a SPARQL query.

More particularly, the dataset requester inputs the information related to the new dataset, such as dataset identification, dataset description, knowledge graph endpoint, and endpoint credentials (if needed).

The dataset requester is responsible for identifying the types of questions that will be part of the dataset.

The dataset requester, for each query template, configures an associated question template. The question template is a template of how a question is generated, such as "What is (answer) of (e)?" Optionally, the dataset requester can also restrict predicates used in the question template. Essentially a question template represents the string pattern of the template question that will be shown to the question writers.

More particularly, the dataset requester is specifying, for each "type" of question, a SPARQL query template, a question template, and a list of valid predicates (when needed).

Any valid SPARQL query is allowed as the basis for a template, but some of the used variables should obey the following convention: they are either answer, $\{e_n\}$, or $\{p_n\}$. This predefined format allows the system to, at runtime, build a proper SPARQL query by replacing $\{e_n\}$ and $\{p_n\}$ with predefined entities and predicates, respectively. The answer variable specifies which part of the retrieved query refers to the answer to the question to be built.

Additional examples of SPARQL query templates include the following:
Single Fact
SELECT ?answer WHERE {?{e} ?{p} ?answer.}
Count
COUNT ?{e2} WHERE {?{e} ?{p} ?{e2}}

As to the question templates, any valid string of characters is allowed as a basis for a question template, but $\{e_n\}$ and $\{p_n\}$ should be part of the string and used as placeholders for the entities and predicates determined at runtime. This predetermined format allows the system, at runtime, to build a "question" that will be shown to users so as to be rewritten. The following are additional examples of question templates:
Single Fact
What is {p} of {e}?
Count
How many {p} are for {e}?

For some query templates, not all predicates would result in sensical questions. For instance, using the UniformNames predicate in a count question could make questions such as "How many UniformNames does the Warehousing industry have?" to be added. The dataset requester has the possibility of specifying which predicates can be used with each query template, as exemplified by {p:[hasMetricProcessMetric]}.

Configuration 308 data may be used to set up a data model, and the dataset configuration after such configuration is stored in a dataset configuration database 310.

Figure 4:
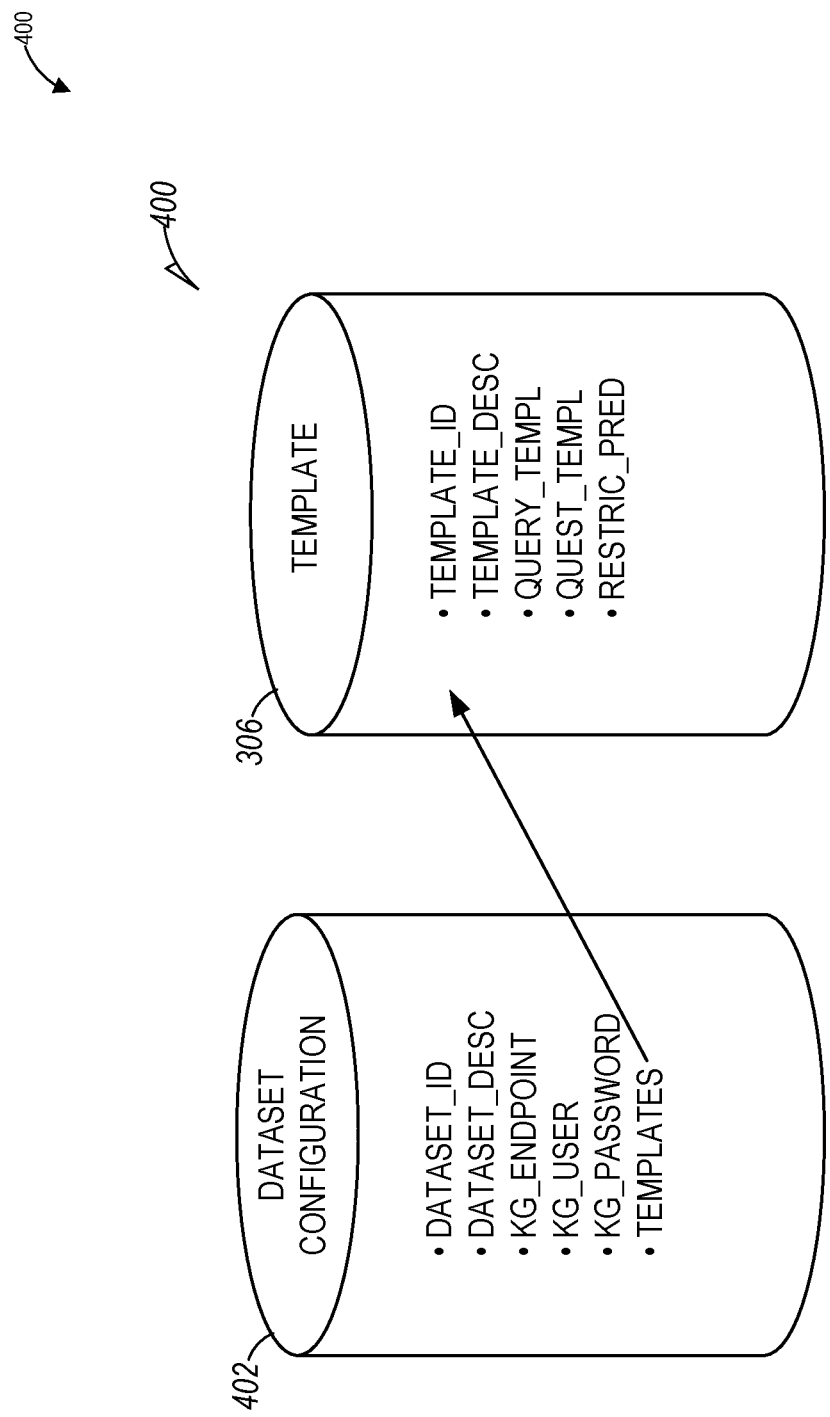
FIG. 4 is a diagram illustrating a data model after configuration, in accordance with an example embodiment.
Figure 5:
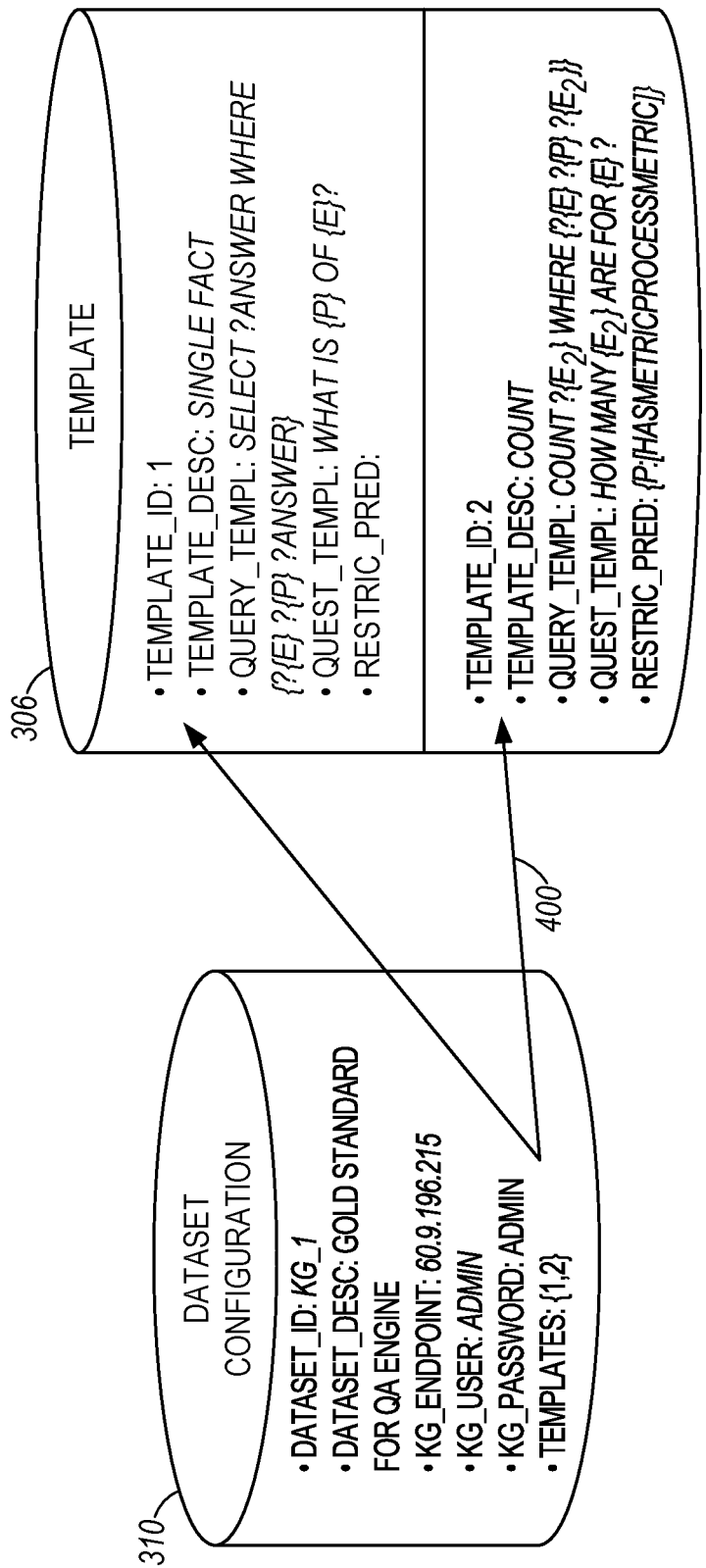
FIG. 5 is a diagram illustrating an example of how a data model would look with actual examples, in accordance with an example embodiment.

FIG. 4 is a diagram illustrating a data model after configuration, in accordance with an example embodiment. Here, dataset configuration database 310 contains various classes, including templates 400, which point to different templates in the template database 306. FIG. 5 is a diagram illustrating an example of how a data model would look with actual examples, in accordance with an example embodiment. Here, for example, templates 400 include template 1 and template 2, both of which are fully defined in the template database 306.

Referring back to FIG. 3, the template generation question component 304 then, for each query template, picks entities and predicates, generates a template question, and prompts one or more question writers. More particularly, the template generation question component 304 randomly picks entities and predicates, potentially favoring more "important" ones (as will be described in more detail below). Then, the template generation question component 304 generates a template question based on each configured SPARQL query template and associates question template. Then the template generation component 304 prompts the one or more question writers to enter a natural language question that correctly reflects the meaning of the template question shown to them.

A template question is essentially an intermediate stage between natural language and the formal language of SPARQL.

The question template placeholders are replaced with values from the previous step and a new template question is generated.

More particularly, the system loops through all the query templates that were configured and, for all entity and predicate placeholders in the template, the system selects appropriate values according to a logic. In an example embodiment, this logic is as follows.

---

Input: Graph G and Query Template $Q_T$
Step 1: Create SPARQL Query from $Q_T$ by building SELECT statement with all variables in $Q_T$ and maintaining WHERE clause
  Step 2: T = run Query on G
  Step 3: While len(T) > 1:
    for column $C_i$ in T
      for distinct value $V_j$ in $C_i$ $$PCV_{i,j} = \frac{(\text{number of rows with } C_i \text{ equal to } V_j)}{len(T)}$$

randomly pick (i_pick, j_pick) according to probabilities $PCV_{i,j}$
  T = ( select from T where $C_{i\_pick}$ equals $V_{j\_pick}$)
Output: T

---

The following are examples of template questions:
Single Fact
What is the {hasMemberBusinessActivity} of {Demand Planning}?
Count
How many {hasMetricProcessMetric} are for {Manage pay}?

The one or more question writer is shown the generated template question, with an associated answer, and asked to produce a corresponding natural language question.

Figure 6:
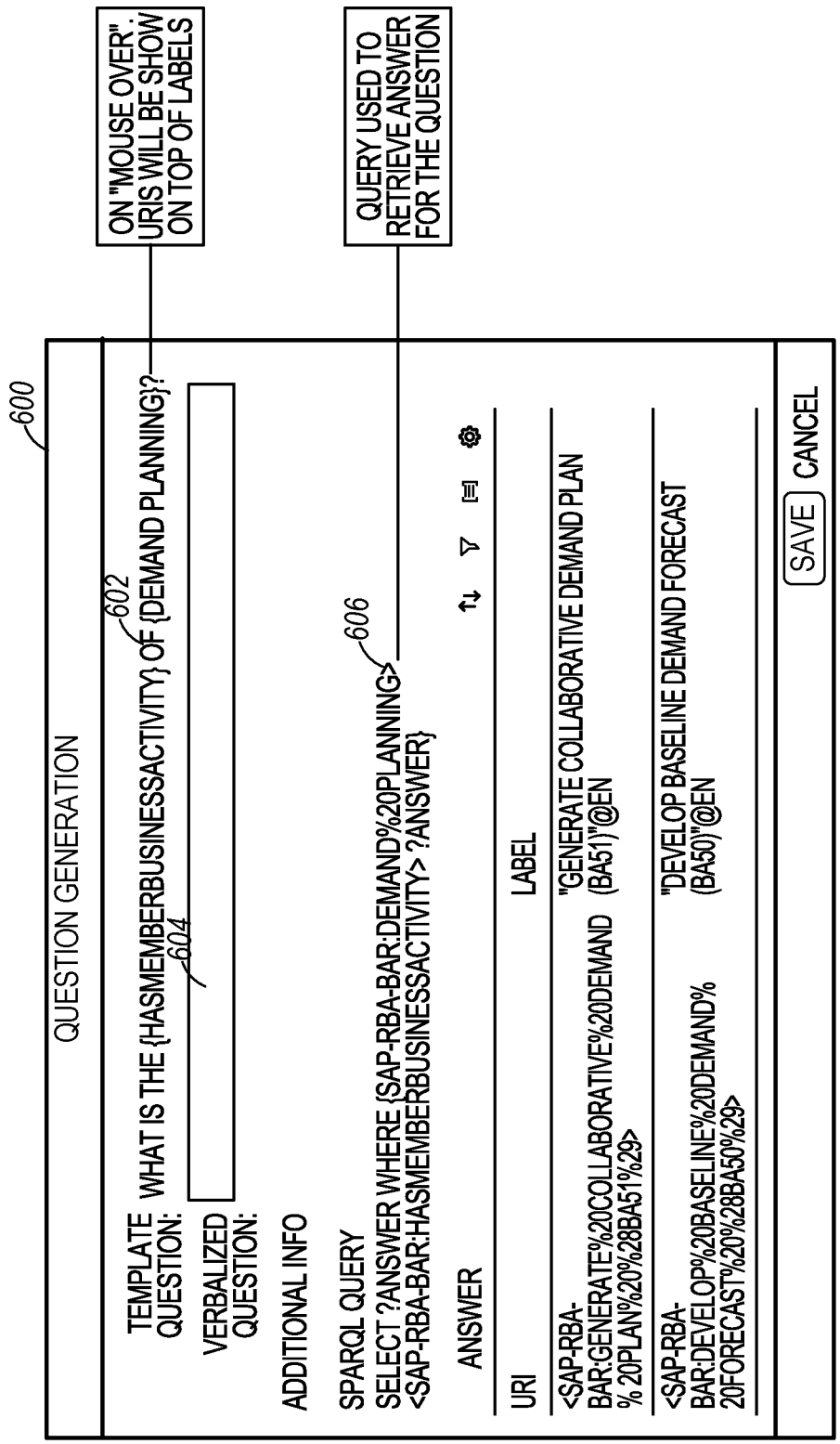
FIG. 6 is a screen capture illustrating an example of a question generation user interface, in accordance with an example embodiment.

FIG. 6 is a screen capture illustrating an example of a question generation user interface 600, in accordance with an example embodiment. Here, for example, the template question 602 is displayed on the user interface 600 along with a text box 604 where a user can write in the verbalized question. On mouseover (otherwise known as hovering) on the template question 602, a window may pop-up displaying a list of uniform resource identifiers (URIs) for the various entities or predicates.

Also displayed is the SPARQL query 606, which is the actual query language query used to retrieve the answer for the question, as well as an answer 608 retrieved from the corresponding database using the SPARQL query 606.

Examples of natural language questions produced by the one or more question writer include:
Single Fact
Which Business Activities are part of Demand Planning?
Count
How many Process Metrics exist for Manage Pay?

Figure 7:
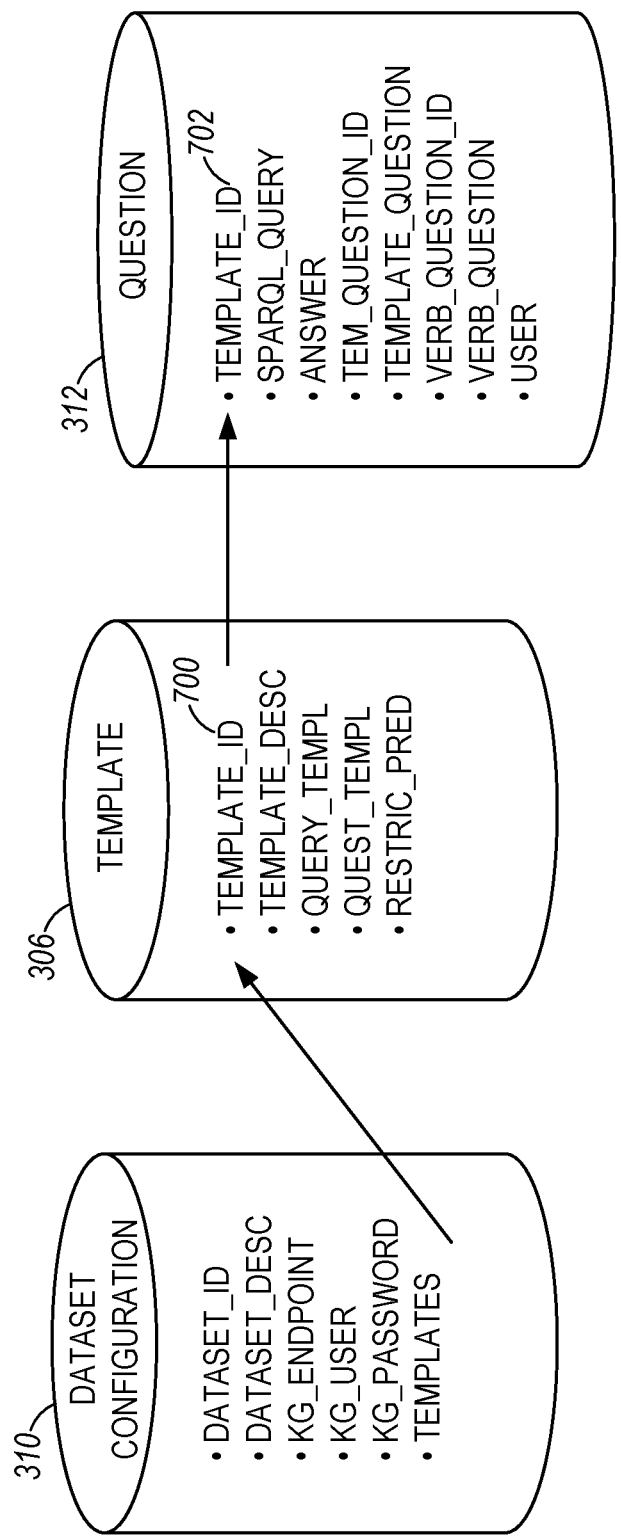
FIG. 7 is a block diagram illustrating an example of a data model after question generation, in accordance with an example embodiment.
Figure 8:
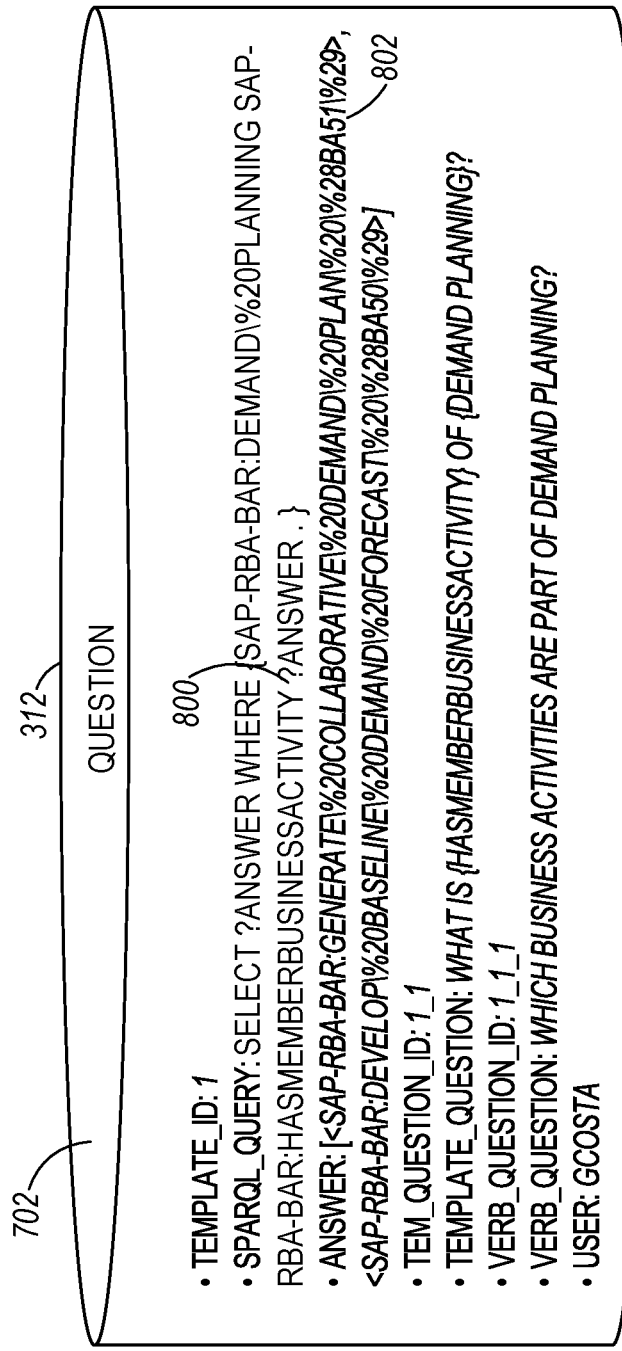
FIG. 8 is a diagram illustrating an example question database after question generation, in accordance with an example embodiment.

The questions are then stored in question database 312 as shown in FIG. 7. FIG. 7 is a block diagram illustrating an example of a data model after question generation, in accordance with an example embodiment. As can be seen, each template ID 700 may point to a corresponding question 702 in question database 312. FIG. 8 is a diagram illustrating an example question database after question generation, in accordance with an example embodiment. Here, the question 702 is populated with the specific text of the SPARQL query 800 and answer 802, among other information.

For every question written by users, the system then can, in an example embodiment, generate an additional n (e.g., n=3) semantically equivalent questions. This may be achieved by feeding the original typed question into a pre-trained text-to-text natural language processing (NLP) artificial intelligence model 309. Thus, for example, if the original typed question is "Which business activities are part of demand planning," the NLP artificial intelligence model may generate "What are the business activities in demand planning," "What business activities are contained in demand planning," and "Which business activities are used for planning demand."

An example of an NLP artificial intelligence model is T5X, from Google, Inc. of Mountain View, California.

Figure 9:
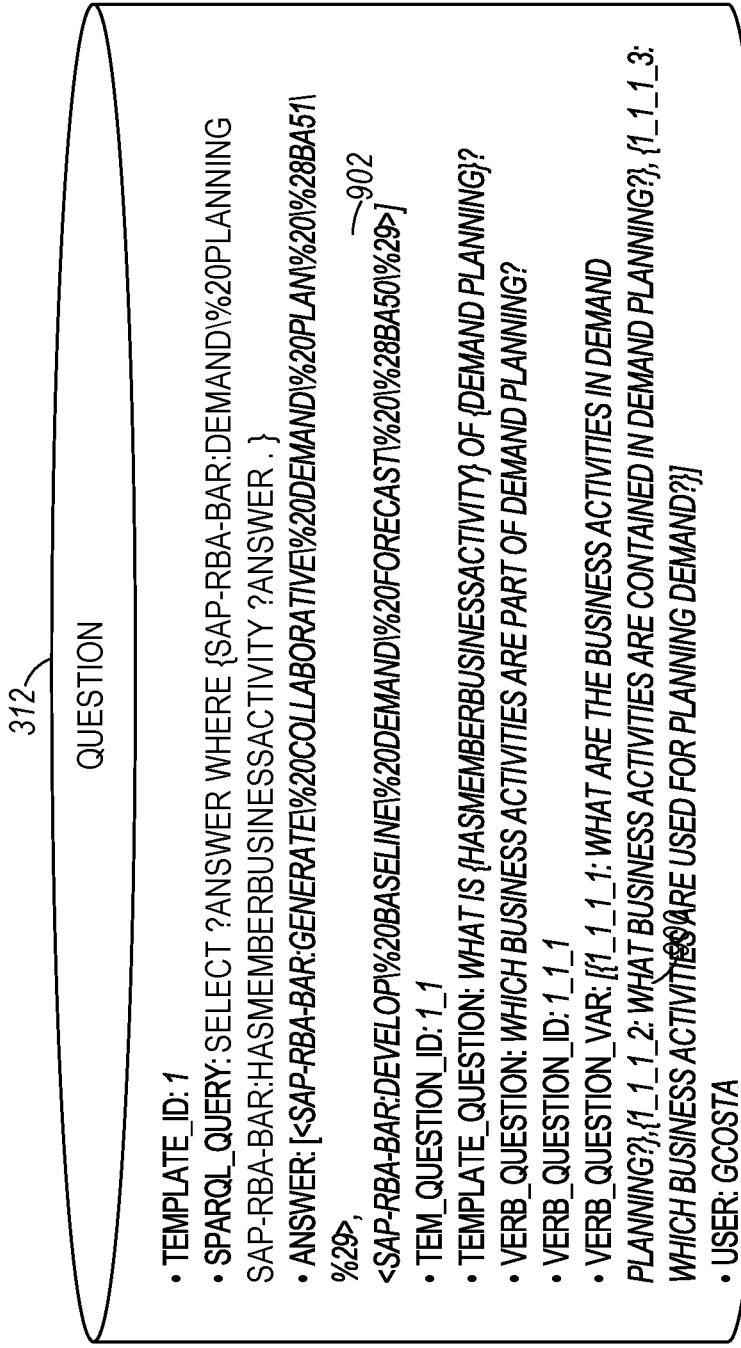
FIG. 9 is a diagram illustrating the example question database after linguistic variations, in accordance with an example embodiment.

FIG. 9 is a diagram illustrating the example question database 312 after linguistic variations, in accordance with an example embodiment. Here, for example, the linguistic variations 900 are provided along with the natural language version 902 of the question.

Referring back to FIG. 3, a gamification component 302 may be used to have users interact with a solution via a "game-like" approach. More particularly, users' actions are evaluated, for each dataset, via a dynamic scoring system. Users whose actions are judged to positively contribute to the overall quality of the datasets created receive points, while users whose actions are to be judged to negatively contribute to the overall quality of the datasets created lose points. This allows for users to be rewarded based on their scores (e.g., badges, incentives) and promotes the quality and trust in the solution outputs.

Figure 10:
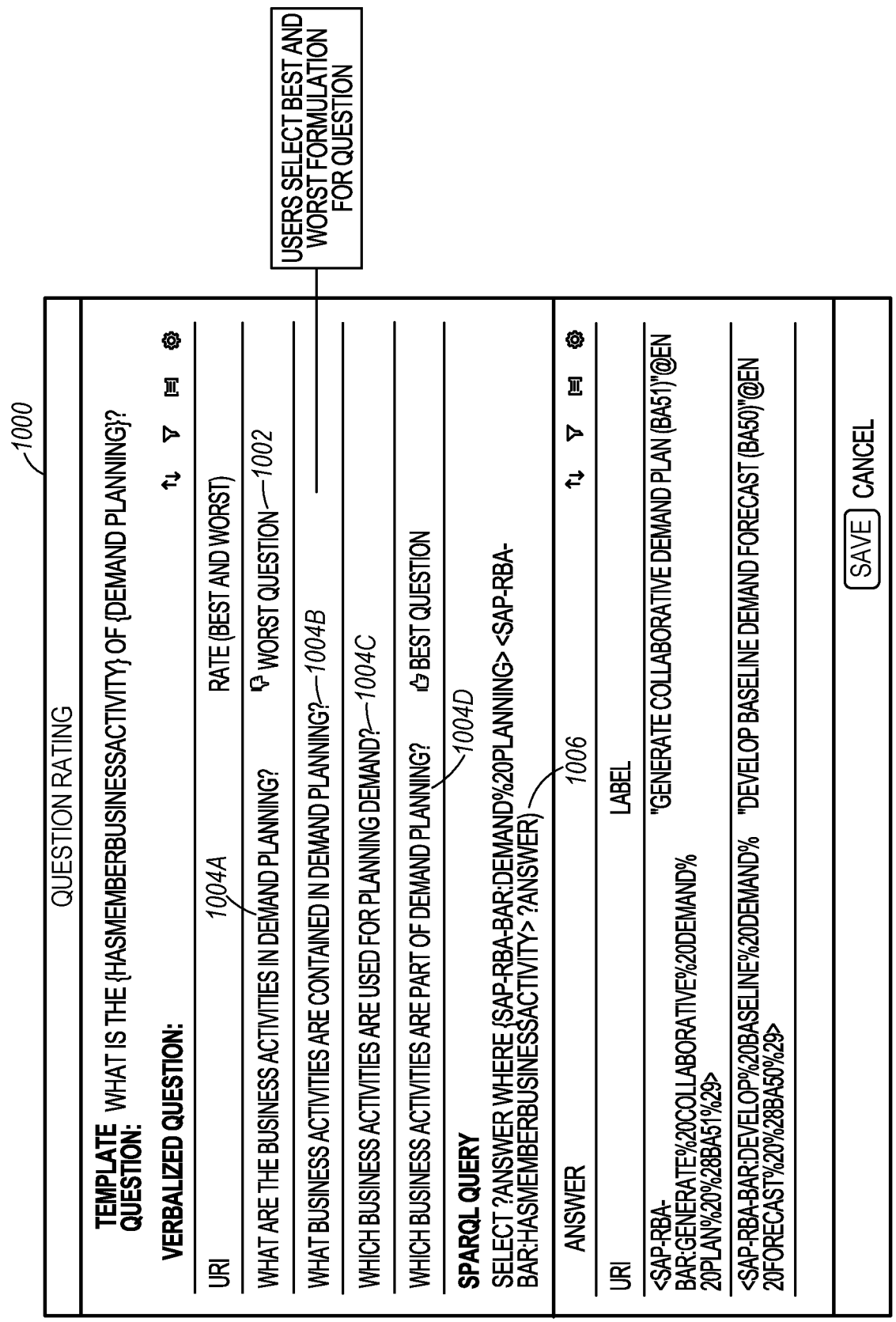
FIG. 10 is a diagram illustrating a screen capture of a gamification user interface, in accordance with an example embodiment.

The core of this scoring system is based on two interactions: creating natural language questions and evaluating natural language questions. Evaluation of natural language questions may be made via a specific user interface, where users are asked to judge the quality of different natural language questions associated with a single template question. FIG. 10 is a diagram illustrating a screen capture of a gamification user interface 1000, in accordance with an example embodiment. Here, for example a user may provide ratings 1002 for various natural language questions 1004A, 1004B, 1004C, 1004D corresponding to a single template question 1006. Here, the ratings 1002 are provided by ranking the natural language questions 1004A, 1005B, 1004C, 1004D, but one of ordinary skill in the art will recognize that other ways to rate or rank the natural language questions can be provided, such as a numeric scale, star ratings, or alphabetical ratings.

In an example embodiment, the following logic may be used for scoring:

```
Input: user
Step 1: for Template Question T_Q in dataset for which user typed
Verbalized Question V_Q :
    if V_Q has highest number of "best question" tags for this
T_Q:
        score += 20
    elif V_Q does not have highest number of "worst question"
tags for this T_Q:
        score += 10
    else:
        score -= 10
Step 2: for Verbalized Question V_Q in dataset which user has tagged :
    if users's tag ("best" or "worst") agrees with the majority of
tags for V_Q :
        score += 2
    elif users's tag does not contradict the majority of tags for
V_Q :
        score += 1
    else:
        score -= 1
Output: score
```

Referring back to FIG. 3, the question rating 314 component may provide the user interface for rating the questions, and the scoring component 316 may collect the scores. The scores may be stored in a score database 318.

While the gamification process motivates users to participate in data collection, the automatic creation of trust scores is a beneficial side-product useful for further processing. Specifically, input by highly trusted users, for instance, may be validated less often.

The questions from the question database 312, along with the scores from the score database 318, may be used to construct training data using training data file generator 320. At this point, the scores may be translated into confidence scores, such that each confidence score indicates a confidence level in the accuracy of a corresponding natural language question version of a template question. In some instances, the original scores in the score database 318 may be assigned specifically to users, and thus may have to be translated into confidence scores pertaining to individual natural language question versions based upon which natural language question versions were input by which users. In other instances, the original scores in the score database 318 were assigned to the natural language question versions when they were input and thus just need to be carried over, and possibly normalized, for inclusion as confidence scores.

Figure 11:
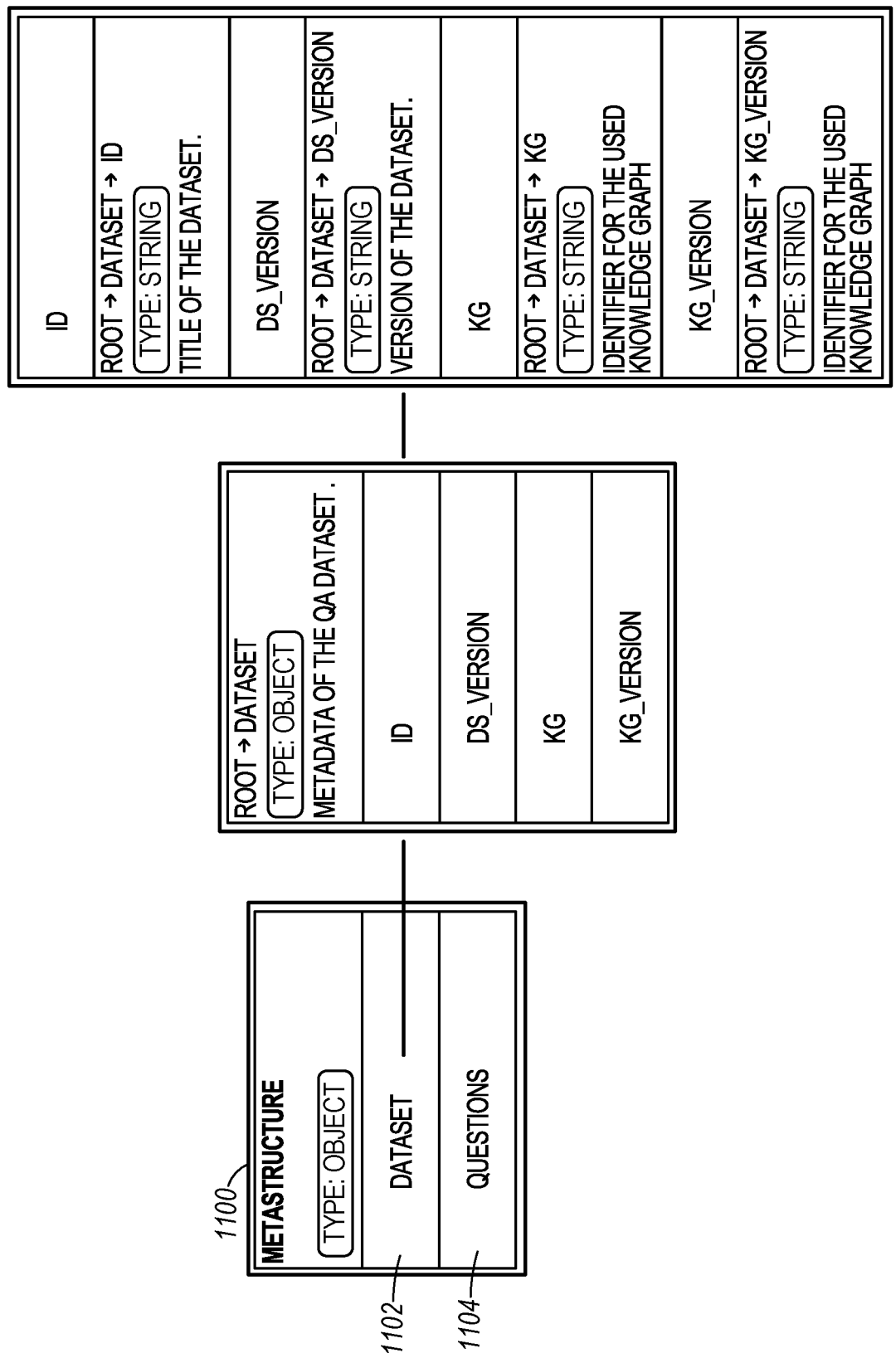
FIG. 11 is a diagram illustrating an example of a first portion of a metastructure format, in accordance with an example embodiment.

In an example embodiment, the training data file generator 320 generates files in a metastructure format. FIG. 11 is a diagram illustrating an example of this metastructure format. Here, a metastructure object 1100 contains information about a dataset 1102 and questions 1104. FIG. 11 depicts the remainder of the metastructure format for objects corresponding to the dataset. FIG. 12 depicts the remainder of the metastructure format for objects corresponding to the questions 1104.

As mentioned briefly above, the result of the above process is a database of data structures containing information about question templates, associated natural language questions, and other information such as confidence scores. These data structures may then be used to train a question/answer machine learning model trained to output an answer, from the corresponding knowledge graph to a natural language question, including a natural language question that may not have been present in the data structures. Specifically, the data structures constitute training data for the training of the question/answer machine learning model.

The question/answer machine learning model may be trained by any model from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the machine learning algorithm used to train the question/answer machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the question/answer machine learning model may take place as a dedicated training phase. In other example embodiments, the question/answer machine learning model may be retrained dynamically at runtime by the user providing live feedback.

Figure 13:
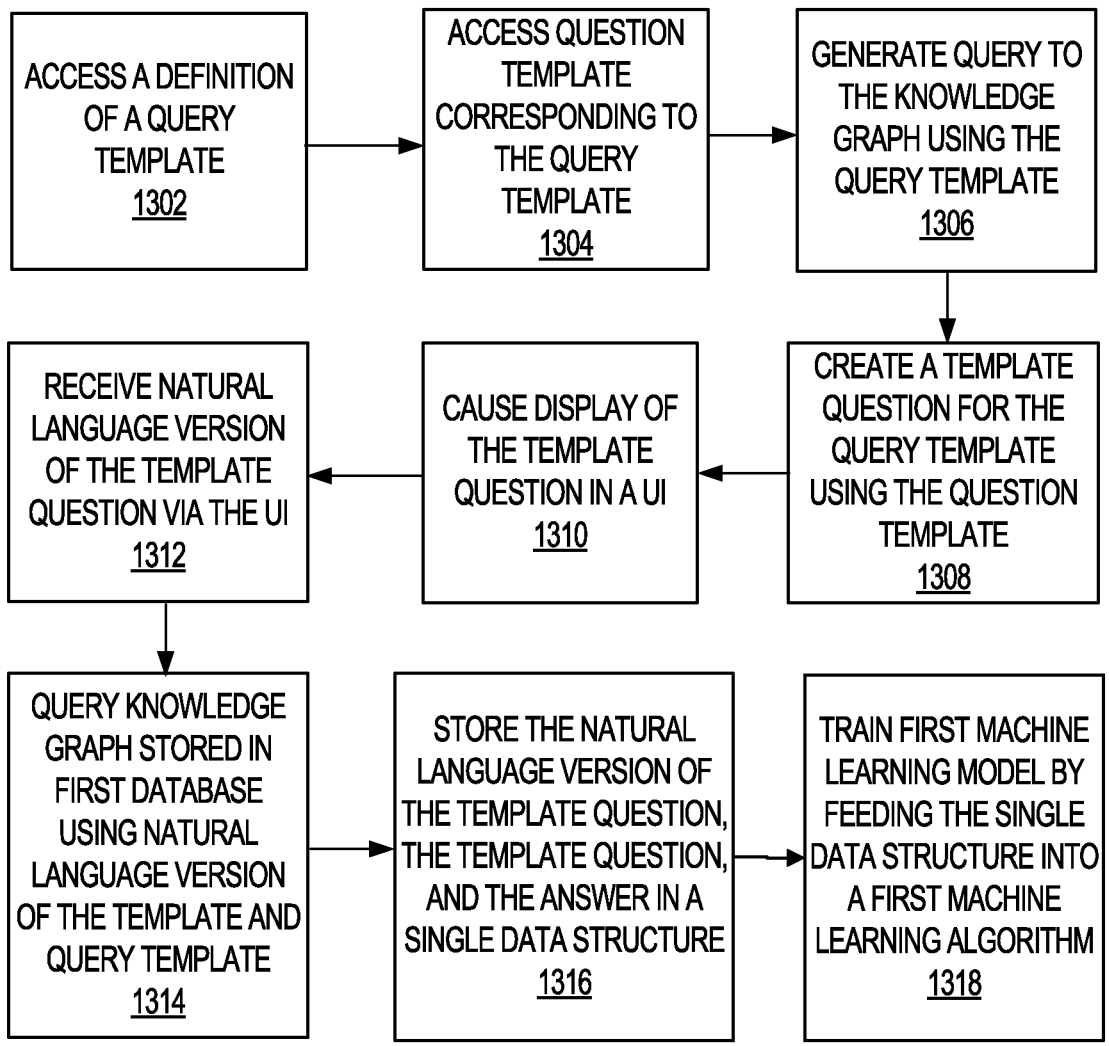
FIG. 13 is a flow diagram illustrating a method, in accordance with an example embodiment.

FIG. 13 is a flow diagram illustrating a method 1300, in accordance with an example embodiment. At operation 1302, a definition of a query template indicating a format of a query to be performed on a knowledge graph in a first database is accessed. The query template contains variables including one or more entities and one or more predicates. At operation 1304, a question template corresponding to the query template is accessed. The question template contains the same variables as the query template, the question template written in a natural language.

At operation 1306, a query is generated in the query language to the knowledge graph in the database using the query template, producing a table containing one or more values for each of the one or more entities and one or more values for each of the one or more predicates. At operation 1308, a template question is created by replacing the one or more entities in the question template with corresponding one or more values from the table and replacing the one or more predicates in the question template with corresponding one or more values from the table. At operation 1310, display of the template question in a UI is caused.

At operation 1312, a natural language version of the template question is received via the UI. At operation 1314, the knowledge graph stored in the first database is queried by replacing the one or more entities in the query template with the corresponding one or more values from the table and replacing the one or more predicates in the query template with the corresponding one or more values from the table to form a query. The query returns an answer from the first database.

At operation 1316, the natural language version of the template question, the template question, and the answer are stored in a single data structure in a second database. At operation 1318, a first machine learning model is trained to automatically answer questions, using the knowledge graph, to an input natural language question, by feeding the single data structure into a first machine learning algorithm.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
  accessing a definition of a query template indicating a format of a query to be performed on a knowledge graph in a first database, the query template containing variables including one or more entities and one or more predicates;
  accessing a question template corresponding to the query template, the question template containing variables including the variables of the query template;
  generating a query, to the knowledge graph in the database using the query template, producing a table containing one or more values for each of the one or more entities and one or more values for each of the one or more predicates;
  creating a template question by replacing the one or more entities in the question template with corresponding one or more values from the table and replacing the one or more predicates in the question template with corresponding one or more values from the table;
  causing display of the template question in a user interface (UI); and
  receiving a natural language version of the template question via the UI.

Example 2. The system of Example 1, wherein the operations further comprise:
  training a first machine learning model to automatically answer questions, using the knowledge graph, to an input natural language question, by feeding the single data structure into a first machine learning algorithm.

Example 3. The system of Example 2, wherein the operations further comprise:
  retraining the first machine learning model by feeding another data structure containing a second natural language version of the template question, the template question, and the answer into the first machine learning model.

Example 4. The system of any of Examples 1-3, wherein the operations further comprise:
  retraining the first machine learning model by:
  creating a second template question by replacing the one or more entities in the question template with a different corresponding one or more values from the table and/or replacing the one or more predicates in the question template with a different corresponding one or more values from the table;
  causing display of the second template question in the user interface;
  receiving a natural language version of the second template question via the user interface;
  querying the knowledge graph stored in the first database by replacing the one or more entities in the query template with the different corresponding one or more values from the table and/or replacing the one or more predicates in the query template with the different corresponding one or more values from the table to form a second query, the second query returning an answer from the first database;
  storing the natural language version of the second template question, the second template question, and the answer in a second data structure in the second database; and
  feeding the second data structure into the machine learning algorithm.

Example 5. The system of any of Examples 1-4, wherein the operations further comprise:
  generating a plurality of semantically equivalent questions to the template question by feeding the template question into a text-to-text natural language processing artificial intelligence model.

Example 6. The system of any of Examples 1-5, wherein the causing display includes causing display of the template question to a first user, and wherein the operations further comprise:
  causing display of the natural language version of the template question on user interfaces of a plurality of users other than the first user;
  receiving feedback, via the user interfaces, regarding accuracy of the natural language version of the template question, from the plurality of users other than the first user; and
  increasing or decreasing a confidence score associated with the natural language version based on the feedback.

Example 7. The system of Example 6, wherein the operations further comprise:
  training a first machine learning model to automatically answer questions, using the knowledge graph, to an input natural language question, by feeding the single data structure into a first machine learning algorithm, the natural language version of the template question weighted based on the confidence score during the training.

Example 8. A method comprising:
  accessing a definition of a query template indicating a format of a query to be performed on a knowledge graph in a first database, the query template containing variables including one or more entities and one or more predicates;
  accessing a question template corresponding to the query template, the question template containing variables including the variables of the query template;
  generating a query, to the knowledge graph in the database using the query template, producing a table containing one or more values for each of the one or more entities and one or more values for each of the one or more predicates;
  creating a template question by replacing the one or more entities in the question template with corresponding one or more values from the table and replacing the one or more predicates in the question template with corresponding one or more values from the table;
  causing display of the template question in a user interface (UI); and
  receiving a natural language version of the template question via the UI.

Example 9. The method of Example 8, further comprising:
  training a first machine learning model to automatically answer questions, using the knowledge graph, to an input natural language question, by feeding the single data structure into a first machine learning algorithm.

Example 10. The method of Example 9, further comprising:
    retraining the first machine learning model by feeding another data structure containing a second natural language version of the template question, the template question, and the answer into the first machine learning model.

Example 11. The method of any of Examples 8-10, further comprising:
    retraining the first machine learning model by:
    creating a second template question by replacing the one or more entities in the question template with a different corresponding one or more values from the table and/or replacing the one or more predicates in the question template with a different corresponding one or more values from the table;
    causing display of the second template question in the user interface; receiving a natural language version of the second template question via the user interface;
    querying the knowledge graph stored in the first database by replacing the one or more entities in the query template with the different corresponding one or more values from the table and/or replacing the one or more predicates in the query template with the different corresponding one or more values from the table to form a second query, the second query returning an answer from the first database; storing the natural language version of the second template question, the second template question, and the answer in a second data structure in the second database; and
    feeding the second data structure into the machine learning algorithm.

Example 12. The method of any of Examples 8-11, further comprising:
    generating a plurality of semantically equivalent questions to the template question by feeding the template question into a text-to-text natural language processing artificial intelligence model.

Example 13. The method of any of Examples 8-12, wherein the causing display includes causing display of the template question to a first user, and wherein the method further comprises:
    causing display of the natural language version of the template question on user interfaces of a plurality of users other than the first user;
    receiving feedback, via the user interfaces, regarding accuracy of the natural language version of the template question, from the plurality of users other than the first user; and
    increasing or decreasing a confidence score associated with the natural language version based on the feedback.

Example 14. The method of Example 13, further comprising:
    training a first machine learning model to automatically answer questions, using the knowledge graph, to an input natural language question, by feeding the single data structure into a first machine learning algorithm, the natural language version of the template question weighted based on the confidence score during the training.

Example 15. A non-transitory machine-readable medium storing instructions which, when executed by one or more processors, cause the one or more processors to perform operations comprising:
    accessing a definition of a query template indicating a format of a query to be performed on a knowledge graph in a first database, the query template containing variables including one or more entities and one or more predicates;
    accessing a question template corresponding to the query template, the question template containing variables including the variables of the query template;
    generating a query, to the knowledge graph in the database using the query template, producing a table containing one or more values for each of the one or more entities and one or more values for each of the one or more predicates;
    creating a template question by replacing the one or more entities in the question template with corresponding one or more values from the table and replacing the one or more predicates in the question template with corresponding one or more values from the table;
    causing display of the template question in a user interface (UI); and
    receiving a natural language version of the template question via the UI. Example 16. The non-transitory machine-readable medium of Example 15, wherein the operations further comprise:
    training a first machine learning model to automatically answer questions, using the knowledge graph, to an input natural language question, by feeding the single data structure into a first machine learning algorithm.

Example 17. The non-transitory machine-readable medium of Example 16, wherein the operations further comprise:
    retraining the first machine learning model by feeding another data structure containing a second natural language version of the template question, the template question, and the answer into the first machine learning model.

Example 18. The non-transitory machine-readable medium of any of Examples 15-17, wherein the operations further comprise:
    retraining the first machine learning model by:
    creating a second template question by replacing the one or more entities in the question template with a different corresponding one or more values from the table and/or replacing the one or more predicates in the question template with a different corresponding one or more values from the table;
    causing display of the second template question in the user interface;
    receiving a natural language version of the second template question via the user interface;
    querying the knowledge graph stored in the first database by replacing the one or more entities in the query template with the different corresponding one or more values from the table and/or replacing the one or more predicates in the query template with the different corresponding one or more values from the table to form a second query, the second query returning an answer from the first database;
    storing the natural language version of the second template question, the second template question, and the answer in a second data structure in the second database; and
    feeding the second data structure into the machine learning algorithm.

Example 19. The non-transitory machine-readable medium of any of Examples 15-18, wherein the operations further comprise:
    generating a plurality of semantically equivalent questions to the template question by feeding the template question into a text-to-text natural language processing artificial intelligence model.

Example 20. The non-transitory machine-readable medium of any of Examples 15-19, wherein the causing display includes causing display of the template question to a first user, and wherein the operations further comprise:

causing display of the natural language version of the template question on user interfaces of a plurality of users other than the first user;

receiving feedback, via the user interfaces, regarding accuracy of the natural language version of the template question, from the plurality of users other than the first user; and increasing or decreasing a confidence score associated with the natural language version based on the feedback.

Figure 14:
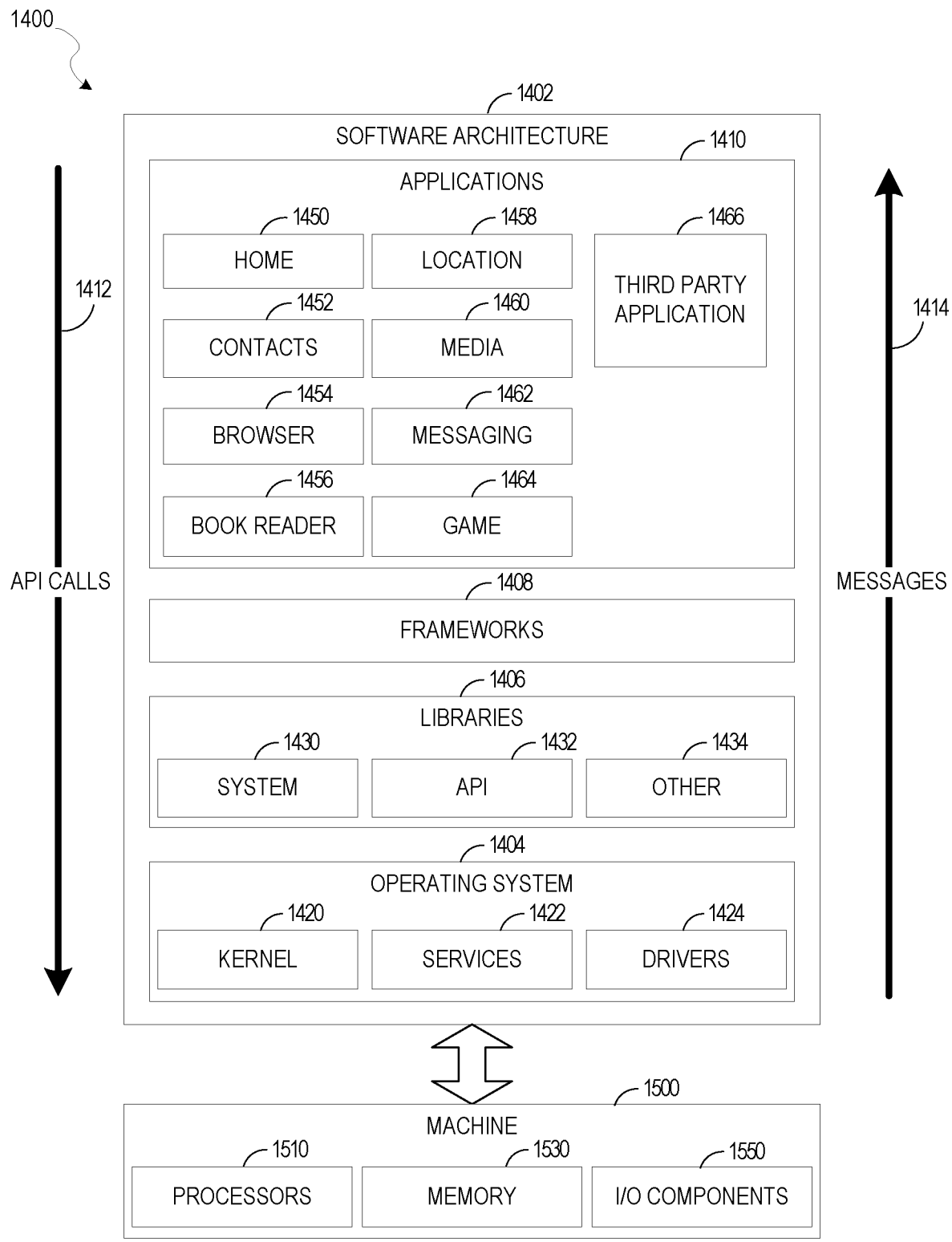
FIG. 14 is a block diagram illustrating a software architecture in accordance with an example embodiment.

FIG. 14 is a block diagram 1400 illustrating a software architecture 1402, which can be installed on any one or more of the devices described above. FIG. 14 is merely a non-limiting example of a software architecture, and it will be appreciated that many other architectures can be implemented to facilitate the functionality described herein. In various embodiments, the software architecture 1402 is implemented by hardware such as a machine 1500 of FIG. 15 that includes processors 1510, memory 1530, and input/output (I/O) components 1550. In this example architecture, the software architecture 1402 can be conceptualized as a stack of layers where each layer may provide a particular functionality. For example, the software architecture 1402 includes layers such as an operating system 1404, libraries 1406, frameworks 1408, and applications 1410. Operationally, the applications 1410 invoke Application Program Interface (API) calls 1412 through the software stack and receive messages 1414 in response to the API calls 1412, consistent with some embodiments.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers, consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware. For instance, the drivers 1424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410. For example, the frameworks 1408 provide various graphical user interface (GUI) functions, high-level resource management, high-level location services, and so forth. The frameworks 1408 can provide a broad spectrum of other APIs that can be utilized by the applications 1410, some of which may be specific to a particular operating system 1404 or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications, such as a third-party application 1466. The applications 1410 are programs that execute functions defined in the programs. Various programming languages can be employed to create one or more of the applications 1410, structured in a variety of manners, such as object-oriented programming languages (e.g., Objective-C, Java, or C++) or procedural programming languages (e.g., C or assembly language). In a specific example, the third-party application 1466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1466 can invoke the API calls 1412 provided by the operating system 1404 to facilitate functionality described herein.

Figure 15:
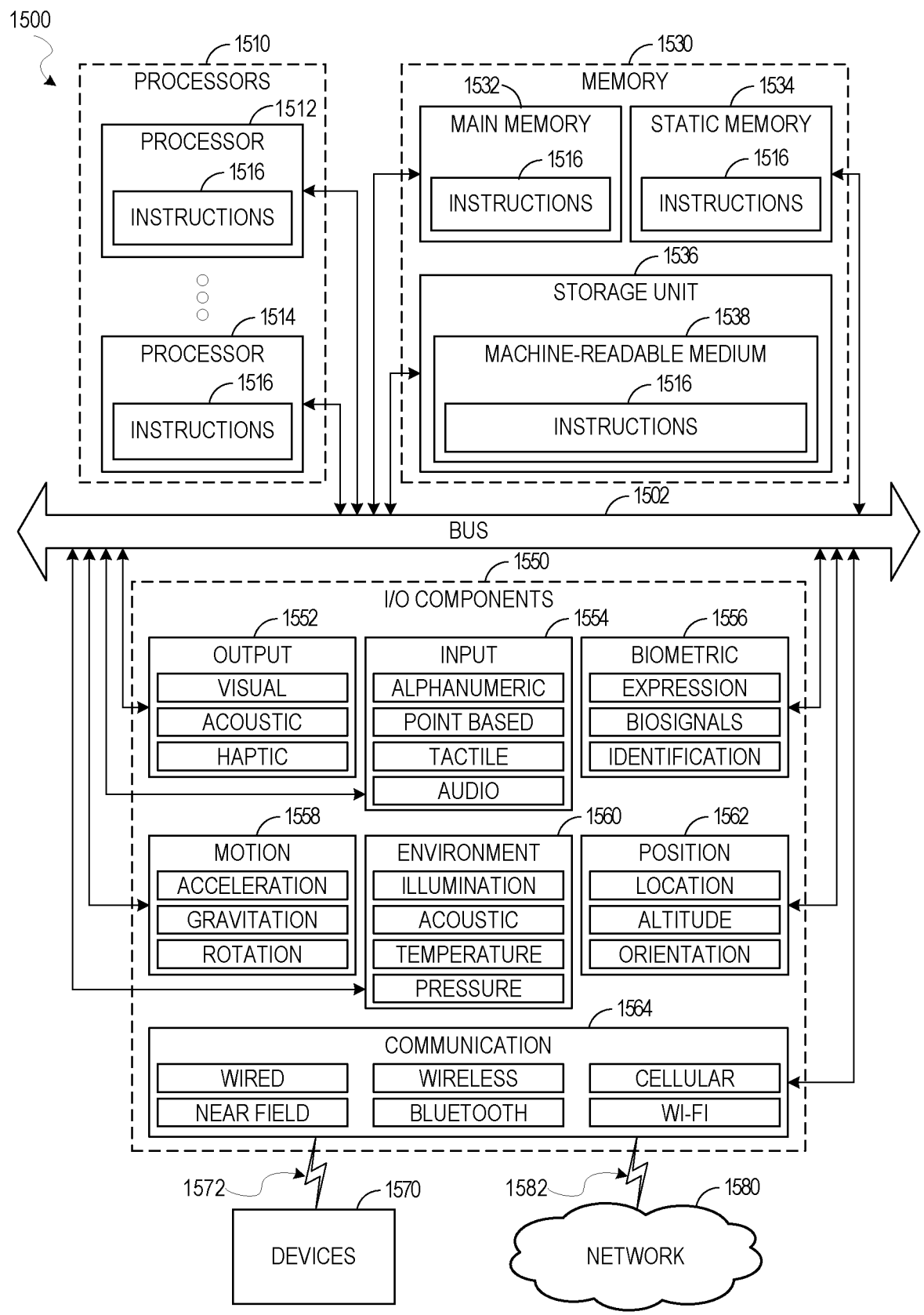
FIG. 15 illustrates a diagrammatic representation of a machine in the form of a computer system within which a set of instructions may be executed for causing the machine to perform any one or more of the methodologies discussed herein.

FIG. 15 illustrates a diagrammatic representation of a machine 1500 in the form of a computer system within which a set of instructions may be executed for causing the machine 1500 to perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. For example, the instructions 1516 may cause the machine 1500 to execute the method of FIG. 13. Additionally, or alternatively, the instructions 1516 may implement FIGS. 1-13 and so forth. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other such as via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1512 and a processor 1514 that may execute the instructions 1516. The term "processor" is intended to include multi-core processors that may comprise two or more independent processors (sometimes referred to as "cores") that may execute instructions 1516 contemporaneously. Although FIG. 15 shows multiple processors 1510, the machine 1500 may include a single processor 1512 with a single core, a single processor 1512 with multiple cores (e.g., a multi-core processor 1512), multiple processors 1512, 1514 with a single core, multiple processors 1512, 1514 with multiple cores, or any combination thereof.

The memory 1530 may include a main memory 1532, a static memory 1534, and a storage unit 1536, each accessible to the processors 1510 such as via the bus 1502. The main memory 1532, the static memory 1534, and the storage unit 1536 store the instructions 1516 embodying any one or more of the methodologies or functions described herein. The instructions 1516 may also reside, completely or partially, within the main memory 1532, within the static memory 1534, within the storage unit 1536, within at least one of the processors 1510 (e.g., within the processor's cache memory), or any suitable combination thereof, during execution thereof by the machine 1500.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion, and the grouping is in no way limiting. In various example embodiments, the I/O components 1550 may include output components 1552 and input components 1554. The output components 1552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562, among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or another suitable device to interface with the network 1580. In further examples, the communication components 1564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., coupled via a USB).

Moreover, the communication components 1564 may detect identifiers or include components operable to detect identifiers. For example, the communication components 1564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

The various memories (i.e., 1530, 1532, 1534, and/or memory of the processor(s) 1510) and/or the storage unit 1536 may store one or more sets of instructions 1516 and data structures (e.g., software) embodying or utilized by any one or more of the methodologies or functions described herein. These instructions (e.g., the instructions 1516), when executed by the processor(s) 1510, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, the instructions 1516 may be transmitted or received using a transmission medium via the coupling 1572 (e.g., a peer-to-peer coupling) to the devices 1570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1516 for execution by the machine 1500, and include digital or analog communication signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the at least one hardware processor to perform operations comprising:
accessing a definition of a query template indicating a format of a query to be performed on a knowledge graph in a first database, the query template containing variables including one or more entities and one or more predicates;
accessing a question template corresponding to the query template, the question template containing variables including the variables of the query template;
generating a query, to the knowledge graph in the database using the query template, producing a table containing one or more values for each of the one or more entities and one or more values for each of the one or more predicates;
creating a template question by replacing the one or more entities in the question template with corresponding one or more values from the table and replacing the one or more predicates in the question template with corresponding one or more values from the table;
causing display of the template question in a user interface (UI);
receiving a natural language version of the template question via the UI;
storing the natural language version of the template question, the template question, and an answer in a single data structure; and training a first machine learning model by feeding the single data structure into a first machine learning algorithm.

2. The system of claim 1, wherein the operations further comprise:
querying the knowledge graph stored in the first database by replacing the one or more entities in the query template with the corresponding one or more values from the table and replacing the one or more predicates in the query template with the corresponding one or more values from the table to form a query, the query returning an answer from the first database.

3. The system of claim 1, wherein the operations further comprise:
retraining the first machine learning model by feeding another data structure containing a second natural language version of the template question, the template question, and the answer into the first machine learning model.

4. The system of claim 1, wherein the operations further comprise:
retraining the first machine learning model by:
creating a second template question by replacing the one or more entities in the question template with a different corresponding one or more values from the table and/or replacing the one or more predicates in the question template with a different corresponding one or more values from the table;
causing display of the second template question in the user interface;
receiving a natural language version of the second template question via the user interface;
querying the knowledge graph stored in the first database by replacing the one or more entities in the query template with the different corresponding one or more values from the table and/or replacing the one or more predicates in the query template with the different corresponding one or more values from the table to form a second query, the second query returning an answer from the first database;
storing the natural language version of the second template question, the second template question, and the answer in a second data structure in the second database; and
feeding the second data structure into the first machine learning algorithm.

5. The system of claim 1, wherein the causing display includes causing display of the template question to a first user, and wherein the operations further comprise:
causing display of the natural language version of the template question on user interfaces of a plurality of users other than the first user;
receiving feedback, via the user interfaces, regarding accuracy of the natural language version of the template question, from the plurality of users other than the first user; and
increasing or decreasing a confidence score associated with the natural language version based on the feedback.

6. The system of claim 5, wherein the operations further comprise:
training a first machine learning model to automatically answer questions, using the knowledge graph, to an input natural language question, by feeding the single data structure into a first machine learning algorithm, the natural language version of the template question weighted based on the confidence score during the training.

7. A method comprising:
accessing a definition of a query template indicating a format of a query to be performed on a knowledge graph in a first database, the query template containing variables including one or more entities and one or more predicates;
accessing a question template corresponding to the query template, the question template containing variables including the variables of the query template;
generating a query, to the knowledge graph in the database using the query template, producing a table containing one or more values for each of the one or more entities and one or more values for each of the one or more predicates;
creating a template question by replacing the one or more entities in the question template with corresponding one or more values from the table and replacing the one or more predicates in the question template with corresponding one or more values from the table;
causing display of the template question in a user interface (UI);
receiving a natural language version of the template question via the UI;
storing the natural language version of the template question, the template question, and an answer in a single data structure; and
training a first machine learning model by feeding the single data structure into a first machine learning algorithm.

8. The method of claim 7, further comprising:
retraining the first machine learning model by feeding another data structure containing a second natural language version of the template question, the template question, and the answer into the first machine learning model.

9. The method of claim 7, further comprising:
retraining the first machine learning model by:
creating a second template question by replacing the one or more entities in the question template with a different corresponding one or more values from the table and/or replacing the one or more predicates in the question template with a different corresponding one or more values from the table;
causing display of the second template question in the user interface;
receiving a natural language version of the second template question via the user interface;
querying the knowledge graph stored in the first database by replacing the one or more entities in the query template with the different corresponding one or more values from the table and/or replacing the one or more predicates in the query template with the different corresponding one or more values from the table to form a second query, the second query returning an answer from the first database;
storing the natural language version of the second template question, the second template question, and the answer in a second data structure in the second database; and
feeding the second data structure into the first machine learning algorithm.

10. The method of claim 7, further comprising:
generating a plurality of semantically equivalent questions to the template question by feeding the template question into a text-to-text natural language processing artificial intelligence model.

11. The method of claim 7, wherein the causing display includes causing display of the template question to a first user, and wherein the method further comprises:
causing display of the natural language version of the template question on user interfaces of a plurality of users other than the first user;
receiving feedback, via the user interfaces, regarding accuracy of the natural language version of the template question, from the plurality of users other than the first user; and
increasing or decreasing a confidence score associated with the natural language version based on the feedback.

12. The method of claim 11, further comprising:
training a first machine learning model to automatically answer questions, using the knowledge graph, to an input natural language question, by feeding a single data structure storing the natural language version of the template question, the template question, and the answer in a single data structure into a first machine learning algorithm, the natural language version of the template question weighted based on the confidence score during the training.

13. A non-transitory machine-readable medium storing instructions which, when executed by one or more processors, cause the one or more processors to perform operations comprising:
accessing a definition of a query template indicating a format of a query to be performed on a knowledge graph in a first database, the query template containing variables including one or more entities and one or more predicates;
accessing a question template corresponding to the query template, the question template containing variables including the variables of the query template;
generating a query, to the knowledge graph in the database using the query template, producing a table containing one or more values for each of the one or more entities and one or more values for each of the one or more predicates;
creating a template question by replacing the one or more entities in the question template with corresponding one or more values from the table and replacing the one or more predicates in the question template with corresponding one or more values from the table;
causing display of the template question in a user interface (UI);
receiving a natural language version of the template question via the UI;
storing the natural language version of the template question, the template question, and an answer in a single data structure; and
training a first machine learning model by feeding the single data structure into a first machine learning algorithm.

14. The non-transitory machine-readable medium of claim 13, wherein the operations further comprise:
retraining the first machine learning model by feeding another data structure containing a second natural language version of the template question, the template question, and the answer into the first machine learning model.

15. The non-transitory machine-readable medium of claim 13, wherein the operations further comprise:
retraining the first machine learning model by:
creating a second template question by replacing the one or more entities in the question template with a different corresponding one or more values from the table and/or replacing the one or more predicates in the question template with a different corresponding one or more values from the table;
causing display of the second template question in the user interface;
receiving a natural language version of the second template question via the user interface;
querying the knowledge graph stored in the first database by replacing the one or more entities in the query template with the different corresponding one or more values from the table and/or replacing the one or more predicates in the query template with the different corresponding one or more values from the table to form a second query, the second query returning an answer from the first database;
storing the natural language version of the second template question, the second template question, and the answer in a second data structure in the second database; and
feeding the second data structure into the first machine learning algorithm.

16. The non-transitory machine-readable medium of claim 13, wherein the operations further comprise:
generating a plurality of semantically equivalent questions to the template question by feeding the template question into a text-to-text natural language processing artificial intelligence model.

17. The non-transitory machine-readable medium of claim 13, wherein the causing display includes causing display of the template question to a first user, and wherein the operations further comprise:
causing display of the natural language version of the template question on user interfaces of a plurality of users other than the first user;
receiving feedback, via the user interfaces, regarding accuracy of the natural language version of the template question, from the plurality of users other than the first user; and
increasing or decreasing a confidence score associated with the natural language version based on the feedback.

* * * * *